May 18, 1954 R. S. JOSE 2,679,029

MODULATOR CIRCUIT

Filed May 15, 1952 2 Sheets-Sheet 1

INVENTOR.
Robert S. Jose

BY Charles H. Brown

ATTORNEY

INVENTOR.
Robert S. Jose
BY Charles H. Brown
ATTORNEY

Patented May 18, 1954 2,679,029

UNITED STATES PATENT OFFICE 2,679,029

MODULATOR CIRCUIT

Robert S. Jose, Haddonfield, N. J., assignor to Radio Corporation of America, a corporation of Delaware Application May 15, 1952, Serial No. 287,915

13 Claims. (Cl. 332—64)

Figure 1:
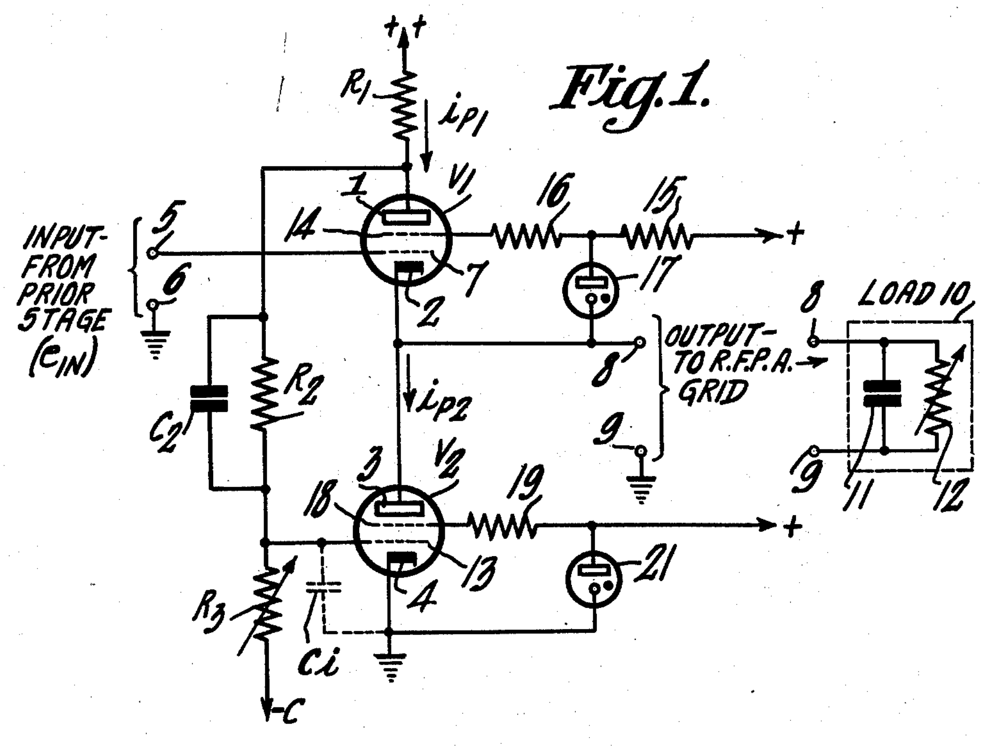

This invention relates to a modulator, and more particularly to a modulator especially useful in the video transmitter portion of a television transmission system.

According to present standards established by the Federal Communications Commission, in a television system the visual information is transmitted by the amplitude modulation process. Therefore, in the visual transmitter, means must be provided to vary the radio frequency (R. F.) carrier level in accordance with the video information. Since the video information signal contains frequencies which vary from zero frequency (direct current) to several megacycles per second, and also abrupt waveforms with short rise times, the circuit arrangement for modulating the R. F. carrier must be chosen with some care. One such circuit arrangement, which has been embodied in several different visual transmitting equipments, is grid modulation of the R. F. power amplifier.

The modulator used for grid modulation of a modulated R. F. power amplifier stage must be capable of maintaining a voltage of uniform amplitude across its load, over the range of video frequencies. Part of this load consists of a capacitance which is the sum of the input (grid-to-ground) capacitance of the modulated amplifier stage, the wiring capacitance and the output capacitance of the modulator itself. This total capacitance may be a hundred to several hundred micromicrofarads, and as a typical example may be 350 micromicrofarads. In addition, the R. F. power amplifier grid will draw current on positive excursions of the modulator output voltage so that, in effect, the modulator load also contains a parallel resistive component which will vary in value from substantially infinity to a relatively low value over the range of modulator output voltage. In other words, then, the load on the modulator stage may be thought of as a capacitance shunted by a variable resistance. This is a nonlinear load.

According to the prior art, a cathode follower stage or class A anode output stage has been used to feed this nonlinear load. The cathode follower has a considerably lower output impedance than the class A stage and was, therefore, generally preferred because the lower output impedance reduced the effect of the nonlinearity of the load. However, the cathode follower stage had to be capable of operating at a relatively high average current and this, of course, is rather uneconomical of tubes.

An object of this invention is to provide a novel, efficient modulator circuit for varying the potential across a nonlinear load in accordince with modulating frequencies in the range from D. C. to several megacycles per second.

Another object is to provide a modulator circuit which has considerably lower output impedance than prior cathode follower modulator circuits.

A further object is to devise a modulator circuit which has higher gain than prior cathode follower modulator circuits.

A still further object is to provide a modulator circuit in which, as compared to prior cathode follower modulator circuits, the maximum continuous current required of the tubes is substantially lowered. This means smaller power supplies, smaller plate dissipation and less heat.

Figures 4, 5:
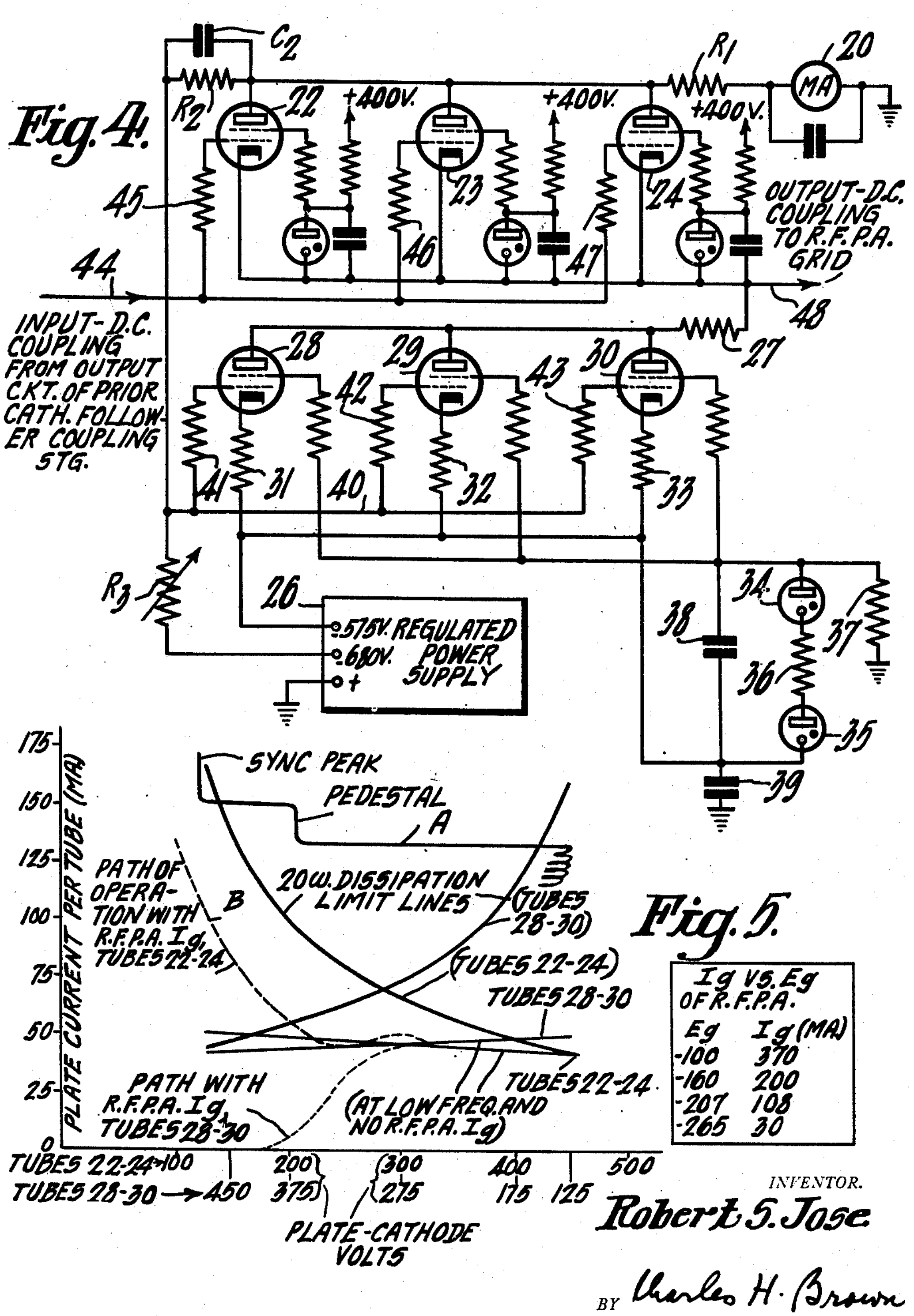

The foregoing and other objects of the invention will be best understood from the following description of an exemplification thereof, reference being had to the accompanying drawings, wherein:

Fig. 1 is a simplified schematic of a modulator circuit arrangement according to this invention;

Figs. 2*a*–2*c* and 3*a*–3*c* are waveform curves useful in explaining the operation of the invention;

Fig. 4 is a schematic of a practical embodiment of this invention, such as might be used in an actual television transmitter; and Fig. 5 is a set of curves useful in illustrating the operation of the invention.

The objects of this invention are accomplished, briefly, in the following manner: Two multi-grid tubes, for example tetrodes or pentodes, have their anode-cathode paths connected in series across a power supply. The input signal of modulation frequency is applied through a D. C. coupling to the control grid of the first tube and the output is taken from the cathode of this tube through a D. C. coupling to the grid of the R. F. power amplifier modulated stage. Feed for the control grid of the second tube is obtained from the anode of the first tube, so that the two control grids are fed essentially antiphaseally. The mode of operation is such that for D. C. and low A. C. frequencies, the modulator circuit operates class A, while for high video frequencies said circuit operates essentially class B.

Now referring to Fig. 1, the anode 1 of an evacuated pentode electron discharge device $V_1$ is connected through a resistor $R_1$ to the positive terminal of a source of high potential, the other terminal of which is grounded. The cathode 2 of device $V_1$ is connected to the anode 3 of a similar evacuated pentode electron discharge device $V_2$ while the cathode 4 of device $V_2$ is grounded and thereby connected to the terminal of the power supply opposite to that to which anode 1 is connected. Thus, it may be stated that the anode-cathode paths of tubes $V_1$ and $V_2$ are essentially connected in series across the power supply (through resistor $R_1$, of course). $V_1$ and $V_2$ are pentode type tubes selected for high mutual conductance ($g_m$) and high zero bias current capabilities. In addition, desirable characteristics for these tubes are low heater-cathode capacitance and reasonable plate dissipation rating. Tubes $V_1$ and $V_2$ may, for example, be of type 6146. Tubes of this type are actually "pentode" and will be referred to as such throughout the present specification. However, to simplify the illustration throughout, only four tube electrodes will be shown, since in tubes of this type grid #3 is internally connected to the cathode.

The input signal to the modulator circuit of Fig. 1, which may for example be a composite video signal including direct current components, is applied from the preceding amplifier stage through a pair of input terminals 5 and 6, terminal 5 being connected directly (by a D. C. coupling devoid of concentrated impedance) to control grid 7 of tube $V_1$ and terminal 6 being grounded. The output signal from the modulator circuit of Fig. 1 is taken off by way of a pair of terminals 8 and 9 and fed to the grid of an R. F. power amplifier stage for grid modulation of such stage, through a direct current connection devoid of concentrated impedance. Terminal 9 is grounded and terminal 8 is connected directly to the grid of the R. F. power amplifier stage. The load 10 presented by the R. F. power amplifier to the modulator circuit is represented as a capacitance 11 shunted by a variable resistance 12, the capacitance representing the input capacitance of the power amplifier stage, together with wiring and other stray capacitance, and the variable resistance representing varying grid current drawn by the power amplifier stage.

In order to feed a signal essentially out of phase with, or in antiphaseal relation to the signal fed to control grid 7 of tube $V_1$, to control grid 13 of tube $V_2$, grid 13 is connected through a parallel RC network comprising resistor $R_2$ and capacitor $C_2$, to anode 1. Negative bias is applied from a suitable bias potential source through an adjustable resistor $R_3$ to grid 13. The input (grid-to-ground) capacitance of tube $V_2$ is represented by $C_1$. Resistors $R_2$ and $R_3$ form an adjustable voltage divider for setting the bias on grid 13, and $C_2$ is chosen so that $R_2C_2$ is equal to $R_3C_1$.

Screen grid potential is supplied to screen grid 14 of tube $V_1$ from a positive potential source which is of somewhat lower potential than the anode potential (indicated by the use of only one plus sign for the screen grid connection and two plus signs for the anode connection), through a pair of series resistors 15 and 16. Resistor 16, which suppresses parasitics, can be omitted in some cases. The screen voltage is regulated by means of a gaseous voltage regulator tube 17 connected between the junction of resistors 15 and 16 and cathode 2. Screen grid potential is supplied to screen grid 18 of tube $V_2$ from the positive potential source, through a parasitic-suppressing resistor 19 if necessary, a gaseous voltage regulator tube 21 being connected from the end of this resistor remote from the grid to ground or cathode 4.

Figures 2A, 2B, 2C, 3A, 3B, 3C:
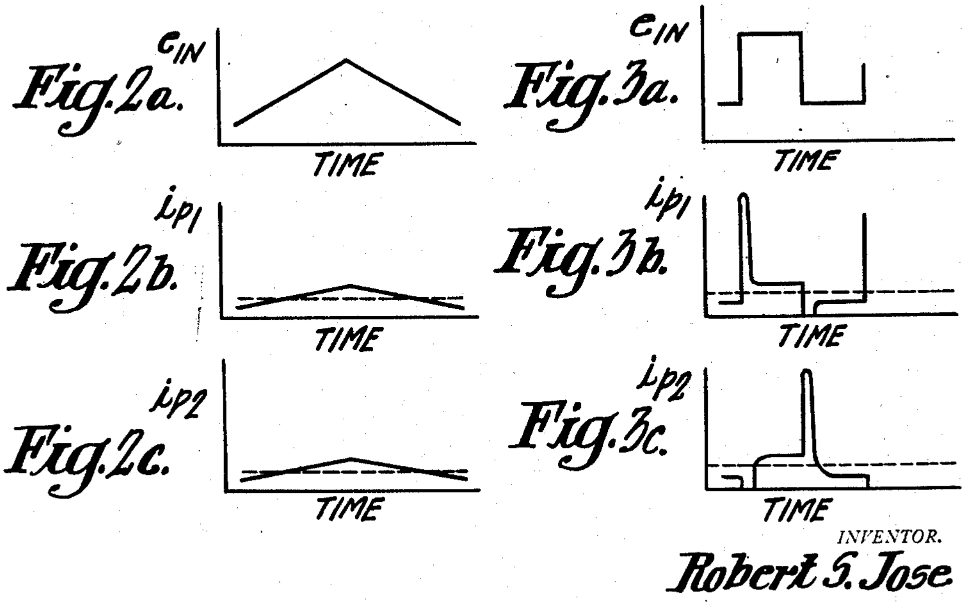

For D. C. level changes and low A. C. frequencies, the circuit of Fig. 1 operates as a class A power transfer circuit, with substantially unity gain. In a class A amplifier of any type, as is well-known to those skilled in the art, plate current flows in the tubes at all times. The current through the upper and lower tubes is the same, since they are in series for direct current (that is, across the power supply or source). For D. C. voltages, then, plate current flows through both tubes at all times and they operate class A. For low A. C. frequencies (a typical low frequency input voltage $e_{IN}$ is illustrated in Fig. 2*a*) the current flow through resistor $R_1$, an extremely small portion of which charges load capacitor 11, is current $i_{P_1}$, illustrated in Fig. 2*b*. This current flow through resistor $R_1$ develops a voltage thereacross which is insufficient in magnitude to cut tube $V_2$ off. This latter tube then has a flow of plate current $i_{P_2}$ therethrough, illustrated in Fig. 2*c*. It may be seen, from an examination of Figs. 2*a*–2*c*, that plate current flows in both tubes $V_1$ and $V_2$ through the entire A. C. cycle, or in other words, that these tubes operate class A at this time.

The circuit of Fig. 1 may be looked upon as a cathode follower $V_1$ with a pentode $V_2$ as a cathode resistance. Since the plate resistance of the type of pentodes used or in general of any pentode is high, it follows that the gain of the modulator stage illustrated closely approaches unity. The excitation for tube $V_2$ is derived from the change of voltage across resistor $R_1$. Since the $g_m$ of each tube is high, a low value of resistance is used for $R_1$. Also, since the plate resistance ($r_p$) of the lower tube $V_2$ is high, the current change through the lower tube and consequently through the upper tube is small, for the full change of input voltage. This relatively small current change is illustrated in Figs. 2*b* and 2*c*.

The quiescent operating point (represented by the horizontal dotted line in each of Figs. 2*b* and 2*c*) is established by adjusting resistor $R_3$.

For high video frequencies where the input signal voltage crosses the reference axis with a high rate of change of voltage, the operation of the circuit described becomes essentially class B, with plate current through each tube being cut off for a portion of each cycle. This operation will become apparent from the following description.

The instantaneous current required to charge or discharge the capacitor is $$C\frac{dv}{dt}$$

where C represents the capacitance of this capacitor and $v$ represents the voltage change across the capacitor, which is virtually the modulator input voltage by virtue of the unity gain of the circuit. Therefore, it may be seen that, as the rate of change of the modulator input voltage increases (that is, as the frequency of the input voltage increases) the instantaneous capacitor charging or discharging current also increases. Thus, at low A. C. input frequencies, the capacitor charging or discharging current is also low. For high positive slopes of input voltages (voltages of high frequencies) the charging current is supplied by tube $V_1$, the same current flow through resistor $R_1$ developing a voltage thereacross of a polarity such as, and of a magnitude sufficient, to cut tube $V_2$ off (for high input frequencies the capacitor charging current is high). In order that the input conductance of the circuit remain low, the capacitor charging current must be available at at least zero bias so that grid 7 never has to be driven positive to obtain the necessary current through tube $V_1$. Therefore, tube $V_1$ should be capable of passing high current at zero bias, particularly at high video frequencies.

The discharging current flows through tube $V_2$ for high negative slopes of input voltage. For such high negative slopes of input, tube $V_1$ is cut off, assuming the rate of change of voltage is fast, since the negative input voltage is applied to grid 7 and is sufficient to cut off tube $V_1$. And, if the value of resistor $R_1$ is properly chosen, the grid 13 (coupled to anode 1 through $R_2$ and $C_2$) then rises to zero bias, allowing tube $V_2$ to pass the requisite current to discharge the capacitance. Therefore, tube $V_2$ should be capable of passing the high discharging current at zero bias, particularly at high video frequencies.

The value of resistor $R_1$ is determined by the amount of current change (from the quiescent value to zero) available in tube $V_1$, and by the voltage necessary to excite grid 13 properly.

For steep transitions of input voltage $e_{IN}$ (square waves, as represented somewhat idealized in order to illuminate the operation in Fig. 3*a*) in either positive or negative sense, the operation of the circuit of Fig. 1 during the times of transition is essentially the same as previously described for high slopes of input voltage. During the positive-going transition the charging current ($i_{P_1}$, Fig. 3*b*) is supplied by tube $V_1$ in the same manner as previously described, except that its waveform is a spike. The width of the spike is determined by the value of capacitor 11 and the output impedance of the modulator circuit. Since the modulator output impedance is quite low, this spike is comparatively narrow. Following the spike, the current $i_{P_1}$ returns to a value slightly different from the average or quiescent value, which latter is represented by a dotted line in Fig. 3*b*. During the negative-going transition the discharging current ($i_{P_2}$, Fig. 3*c*) flows through tube $V_2$ in the same manner as previously described, and here again its waveform is a spike which is rather narrow. Following the spike, the current $i_{P_2}$ returns to a value slightly different from the average or quiescent value, which latter is represented by a dotted line in Fig. 3*c*.

The changeover of the circuit from class A to class B operation is gradual over a range of frequencies, going through a mode of operation analogous to class AB between the two extremes. Further, this range is affected by the value of $R_1$. In general, however, the action will be class A at frequencies below 0.5 megacycle and class B above two megacycles.

The nonlinearity of the load due to grid current in the R. F. power amplifier tube (represented by the variable resistance 12) is entirely absorbed in tube $V_1$. As the output voltage at terminal 8 increases to the point at which the R. F. power amplifier draws grid current, the anode-cathode voltage of tube $V_1$ decreases, only partly because of the increased flow of current through $R_1$ and the consequent lowering of voltage at anode 1, but almost entirely because the output voltage at 8, which is the same as the cathode 2 potential, rises toward the anode voltage as the output voltage at 8 increases. Because of the particular polarity of the connections, only tube $V_1$ can supply the grid current, and as the grid current demand increases as a result of higher grid-cathode voltage on the R. F. amplifier, it does so with a constantly decreasing anode-cathode voltage across $V_1$. This reduces the necessary plate dissipation requirement for tube $V_1$. Furthermore, the increase in the plate current of tube $V_1$ increases the drop across resistor $R_1$, lowering the current that flows through tube $V_2$ (because of the decrease in voltage applied to grid 13) and lessening the current requirement for tube $V_1$.

A mathematical analysis of the circuit of Fig. 1 reveals that the output impedance thereof is represented approximately by the following expression:

$$\frac{1}{g_m}\times\frac{1}{1+g_mR_1} \qquad (1)$$

It is quite well-known that the output impedance of the conventional cathode follower circuit is approximately $$\frac{1}{g_m}$$

$R_1$ and $g_m$ ordinarily have such values as to make the second fraction in Expression 1 substantially less than unit. Therefore, the modulator circuit of this invention has considerably lower output impedance than ordinary or conventional cathode follower modulator circuits.

In a circuit built according to this invention and suitable for a practical embodiment thereof, disclosed in Fig. 4 (to which reference will now be made), $V_1$ and $V_2$ each comprise three type 6146 pentodes in parallel. More specifically, pentodes 22, 23 and 24 of the 6146 type have their anodes connected together and through a resistor $R_1$ and a milliammeter 20 to ground or the positive terminal of a regulated power supply 26. The cathodes of tubes 22—24 are all connected together by a lead 48 and through a resistor 27 of small value to the anodes of three pentodes 28, 29 and 30 of the 6146 type. The cathodes of tubes 28—30 are connected through respective resistors 31, 32 and 33, which serve as shunts for a meter (not shown), to a negative potential point on power supply 26. Thus, it may be seen that the parallel-connected anode-cathode paths of tubes 22—24 are connected effectively in series with the parallel-connected anode-cathode paths of tubes 28—30, across the power supply 26. The screen grid biasing potentials for the upper tubes 22—24 are obtained from a separate power supply (not shown), each through two series-connected resistors corresponding to resistors 15 and 16 in Fig. 1. Each screen grid potential is regulated by a separate gaseous voltage regulator tube similar to 17 which is connected from the junction of the two series resistors of each pair to the cathode of its corresponding tube. The screen grid biasing potentials for the lower tubes 28—30 are obtained from power supply 26, each through a separate resistor corresponding to resistor 19 in Fig. 1. The last-named screen grid potentials are regulated by means of a pair of gaseous voltage regulator devices 34 and 35 connected in series with a resistor 36 between the cathode potential point (—575 volts) on power supply 26 and the commonly-joined ends (remote from the screen grids) of all the screen grid resistors. A resistor 37 is connected from said commonly-joined resistor ends to ground, while a capacitor 38 is connected across the combination of elements 34—36. A capacitor 39 is connected from the cathode potential point on power supply 26 to ground.

In order to supply excitation in proper phase to the control grids of the lower tubes 28—30, the commonly-connected anodes of the upper tubes 22—24 are connected through a parallel RC network $R_2$, $C_2$ to a common control grid lead 40 and also, to provide working bias, through a variable resistor $R_3$ to a point of high negative potential (more negative than the potential supplied to the cathodes of tubes 28—30) on power supply 26. From the common grid lead 40, respective resistors 41, 42 and 43 are connected to the control grids of tubes 28, 29 and 30, respectively.

The input video signal is applied to the modulator circuit of Fig. 4 by way of a lead 44, which preferably constitutes a D. C. input coupling from the cathode (output) circuit of a preceding or prior cathode follower coupling stage. The input signal is coupled in parallel into the control grid or input circuits of tubes 22—24 by means of respective resistors 45, 46 and 47 connected from the lead 44 to the control grids of tubes 22, 23 and 24, respectively. The input signal is thus applied to the three upper tubes (similar to $V_1$ in Fig. 1) in parallel.

The output signal from the modulator circuit of Fig. 4 is taken off by way of the lead 48, which connects the cathodes of all the three upper tubes 22—24 together. Lead 48 preferably constitutes a D. C. output coupling and extends to the grid of a R. F. power amplifier stage, in case grid modulation of such amplifier is desired to be effected.

The operation of the Fig. 4 circuit is precisely the same as that of Fig. 1 previously described, so this description will not be repeated. The resistor $R_1$ is of a value which will provide the best square-wave (transient) response. This occurs at approximately 200 ohms, but is not critical, 175 to 200 ohms giving satisfactory reproduction of a square wave having approximately 0.1 microsecond rise time or decay time.

The circuit of Fig. 4 is supplied from a power source 26 operating with its positive terminal grounded, as illustrated. By proper choice of voltage, this feature allows direct connection of the R. F. power amplifier grid to the output lead 48 of the modulator circuit, entirely eliminating the necessity of including a direct-coupled constant voltage arrangement to displace the output voltage range of the modulator circuit to one that is correct for proper operation of the R. F. power amplifier grid. Thus, the capacitive load on the modulator circuit is reduced, and in addition there is considerable circuit simplification and economy if such a constant voltage arrangement can be eliminated. As an example, the video voltage swing at the cathode lead (output lead) 48 can be from minus 125 volts to minus 475 volts.

The paths of operation for each group of tubes (that is, the upper group 22—24 and the lower group 28—30) are illustrated in Fig. 5, together with the modified paths of operation of these upper and lower tube groups with grid current. The curves are all supplied with appropriate legends. The waveform A at the upper part of this figure, on which the paths of operation are plotted, is that of a horizontal blanking interval, including pedestal and synchronizing peak portions. The peculiar bend of the path of operation (curve B) for the upper tubes 22—24 is due to the increasing R. F. power amplifier grid current and the decreasing current in the lower tubes 28—30. The lower tubes 28—30 must also pass the screen currents of the upper tubes 22—24, amounting to around 25 milliamperes, and it may be noted that the lower tubes never exceed the 20 watts dissipation, when the circuit is operated with R. F. power amplifier grid current.

The load capacitance (represented in Fig. 1 at 11) is approximately 350 micromicrofarads. For a composite video signal (rise time of horizontal blanking pulses, 0.08 microsecond) of 325 volts peak-to-peak, a simple calculation shows that a peak charging or discharging current of approximately one ampere is required. A type 6146 tube is rated at about 400 milliamperes at zero bias, so the use of three in parallel is required to obtain the necessary current of approximately one ampere within ratings.

The output impedance of the modulator is on the order of three ohms, so that by itself the upper half-response frequency point should be at about 15 megacycles with 350 micromicrofarads capacitive load.

This is in contrast to the action of a cathode follower used in television modulator service. In a circuit of this type, it is necessary to allow a minimum cathode current (at the minimum grid voltage) of $$I=\frac{VAC}{1.25T} \qquad (2)$$

where V is the amplitude of the largest step voltage (325 in our example), A is the gain of the cathode follower (assumed to be one for purposes of discussion), C is the output capacitance (350 micromicrofarads), and T is the time in which the fastest voltage transition designed for takes place (0.08 microsecond in our example). Substituting these values in Equation 2, $I=1.13$ amperes. To this minimum current must be added the current representted by $$\frac{V}{R_k}$$

i. e. the A. C. output current range, where $R_k$ is the cathode resistance. With a supply voltage of minus 575 volts and minimum output voltage of minus 450, the value of $R_k$ is $$\frac{575-450}{1.13}=1100 \text{ ohms}$$

The current necessary through $R_k$ to reach synchronizing pulse peak is $$\frac{325}{1100}=0.296 \text{ ampere}$$

Therefore, the tube or tubes used in such circuit must have a range (preferably linear for television service) of plate current versus grid voltage of at least 1.13+.296 amperes=1.426 amperes. It is possible to ease the maximum current requirement for continuous operation slightly from this value by taking into account that synchronizing pulses, which represent the top 25 per cent of the video voltage, occur for only 8 per cent of the time so that the worst condition for continuous operation occurs at a video voltage corresponding to slightly in excess of black level. Therefore, the lowest possible continuous current rating must be at least $$\frac{325\times.75}{1100}+1.13=1.352 \text{ amperes}$$

as compared to only approximately 1 ampere peak current for the circuit of Fig. 4.

Furthermore, it is certainly to be noted that the current just calculated for a cathode follower flows continuously in a cathode follower at black level, whereas in the circuit arrangement of this invention it is necessary that the tubes supply a lower (1.35 as compared with one) peak value of current only, which condition is not at all continuous. In fact, the corresponding black level plate current in a transmitter design according to this invention is approximately only 150 to 175 milliamperes.

The gain of a circuit according to this invention has been found to be substantially one or unity, as was previously stated. For similar tubes used in an ordinary cathode follower circuit, the gain would be on the order of only 0.75. Therefore, in the circuit of this invention there occurs no appreciable loss of gain which must be made up elsewhere, in contradistinction to the situation in a cathode follower circuit of conventional type.

The following values are given by way of example. These are values such as might be used in a practical embodiment of the invention.

| | |
|---|---|
| Tube 34 | OB2. |
| Tube 35 | OB2. |
| Resistor $R_1$ | 200 ohms. |
| Resistor $R_2$ | 68 K. |
| Resistor $R_3$ | 10 K. |
| Resistor 15 | 16 K. |
| Resistor 16 | 33 ohms. |
| Resistor 19 | 33 ohms. |
| Resistor 27 | 10 ohms. |
| Resistors 31, 32, 33 | 5 ohms each. |
| Resistor 36 | 22 ohms. |
| Resistor 37 | 9 K. |
| Resistors 41, 42, 43 | 33 ohms each. |
| Resistors 45, 46, 47 | 33 ohms each. |
| Capacitor $C_2$ | 0.01 mfd. |
| Capacitor 11 | 350 mmfd. (approximately). |
| Capacitor 38 | 10 mfd. |
| Capacitor 39 | 0.1 mfd. |

What is claimed is:

1. In a modulator circuit for supplying modulating voltages to a load including capacitance, a pair of electrode structures each including an anode, a cathode and a control electrode, means connecting the anode-cathode paths of said structures in series across a single potential source, means coupling the said load to the cathode of a first one of said structures, means for applying a modulating voltage to the control electrode of said first structure, and a connection capable of passing direct current coupling the anode of said first structure to the control electrode of a second one of said structures, the peak charging current for the load capacitance being of a value, at high time rates of change of modulating voltage, such as to develop a voltage at the anode of said first structure which is sufficient to bias said second structure to cutoff.

2. In a modulator circuit for supplying modulating voltages to a load including capacitance, a pair of electrode structures each including an anode, a cathode and a control electrode, means connecting the anode-cathode paths of said structures in series across a potential source, means coupling the said load directly between the cathodes of said pair of structures through connections devoid of potential sources and devoid of concentrated impedance, means for applying an alternating modulating voltage directly between the control electrode of a first one of said structures and the cathode of the second one of said structures, and means coupling the anode of said first structure to the control electrode of said second structure, the negative-going portions of the input voltage wave, at high time rates of change of modulating voltage, being sufficient to cut off said first structure, whereby the discharging current of said load capacitance flows through only said second structure.

3. In a modulator circuit for supplying modulating voltage to a load including capacitance, a pair of electrode structures each including an anode, a cathode and a control electrode, means coupling the anode-cathode paths of said structures in series across a single potential source, means coupling the said load to the cathode of a first one of said structures, means for applying an alternating modulating voltage to the control electrode of said first structure, and a connection capable of passing direct current coupling the anode of said first structure to the control electrode of a second one of said structures, the peak charging current for the load capacitance being of a value, at high time rates of change of modulating voltage, such as to develop a voltage at the anode of said first structure which is sufficient to bias said second structure to cutoff, and the negative-going portions of the input voltage wave, at high time rates of change of modulating voltage, being sufficient to cut off said first structure, whereby the discharging current of said load capacitance flows through only said second structure.

4. In an amplifier circuit for supplying modulating voltages to a load, a pair of electrode structures each including an anode, a cathode and a control electrode, means connecting the anode of a first structure through a resistor to one terminal of a potential source, means connecting the cathode of said first structure to the anode of a second structure, means connecting the cathode of said second structure to the other terminal of said potential source, a coupling between the cathode of said first structure and said load, means including a connection capable of passing direct current for applying the voltage drop across said resistor to the control electrode of said second structure, and means for applying a modulating voltage to the control electrode of said first structure, the arrangement being such that the amplifier operates class A for low frequencies of modulating voltage and operates class B for higher frequencies of modulating voltage.

5. In a modulator circuit for supplying modulating voltages to a load including capacitance, a pair of electrode structures each including an anode, a cathode and a control electrode, means connecting the anode of a first structure through a resistor to one terminal of a potential source, means connecting the cathode of said first structure to the anode of a second structure, means connecting the cathode of said second structure to the other terminal of said potential source, a coupling between the cathode of said first structure and said load capacitance, whereby said capacitance may be charged from said source through said resistor and said first structure, means including a connection capable of passing direct current for applying the voltage drop across said resistor to the control electrode of said second structure, and means for applying a modulating voltage to the control electrode of said first structure to control the conductivity thereof, the peak charging current for said load capacitance being directly proportional to the time rate of change of said modulating voltage, said resistor having a value such that for high time rates of change of modulating voltage the charging current flowing therethrough develops a voltage drop thereacross sufficient to bias said second structure to cutoff.

6. In a modulator circuit for supplying modulating voltages to a load including capacitance, a pair of electrode structures each including an anode, a cathode and a control electrode, means connecting the anode of a first structure through a resistor to one terminal of a potential source, means connecting the cathode of said first structure to the anode of a second structure, means connecting the cathode of said second structure to the other terminal of said potential source, a coupling between the cathode of said first structure and one terminal of said load capacitance, a coupling devoid of potential sources and devoid of concentrated impedance between the cathode of said second structure and the other terminal of said capacitance, means for applying the voltage drop across said resistor to the control electrode of said second structure, and means for applying an alternating modulating voltage directly between the control electrode of said first structure and the cathode of said second structure, the negative-going portions of the input voltage wave, at high time rates of change of modulating voltage, being sufficient to cut off said first structure, whereby the discharging current of said load capacitance flows through only said second structure.

7. In a modulator circuit for supplying modulating voltages to a load including capacitance, a pair of electrode structures each including an anode, a cathode and a control electrode, means connecting the anode of a first structure through a resistor to one terminal of a potential source, means connecting the cathode of said first structure to the anode of a second structure, means connecting the cathode of said second structure to the other terminal of said potential source, a coupling between the cathode of said first structure and said load capacitance, whereby said capacitance may be charged from said source through said resistor and said first structure, means including a connection capable of passing direct current for applying the voltage drop across said resistor to the control electrode of said second structure, and means for applying an alternating modulating voltage to the control electrode of said first structure to control the conductivity thereof, the peak charging current for said load capacitance being directly proportional to the time rate of change of said modulating voltage, said resistor having a value such that for high time rates of change of modulating voltage the charging current flowing therethrough develops a voltage drop thereacross sufficient to bias said second structure to cutoff, and the negative-going portions of the input voltage wave, at high time rates of change of modulating voltage, being sufficient to cut off said first structure, whereby the discharging current of said load capacitance flows through only said second structure.

8. In a modulator circuit for supplying modulating voltages to a load including capacitance, a pair of electrode structures each having at least four electrodes and each including an anode, a cathode and a control electrode, said structures each having a high plate resistance, means connecting the anode-cathode paths of said structures in series across a single potential source, means coupling the said load to the cathode of a first one of said structures, means for applying a modulating voltage to the control electrode of said first structure, and a connection capable of passing direct current coupling the anode of said first structure to the control electrode of a second one of said structures, the peak charging current for the load capacitance being of a value, at high time rates of change of modulating voltage, such as to develop a voltage at the anode of said first structure which is sufficient to bias said second structure to cutoff.

9. In a modulator circuit for supplying modulating voltages to a load including capacitance, a pair of electrode structures each having at least four electrodes and each including an anode, a cathode and a control electrode, said structures each having a high plate resistance, means connecting the anode-cathode paths of said structures in series across a single potential source, means coupling the said load directly between the cathodes of said pair of structures through connections devoid of potential sources and devoid of concentrated impedance, means for applying an alternating modulating voltage directly between the control electrode of a first one of said structures and the cathode of the second one of said structures, and means coupling the anode of said first structure to the control electrode of said second structure, the negative-going portions of the input voltage wave, at high time rates of change of modulating voltage, being sufficient to cut off said first structure, whereby the discharging current of said load capacitance flows through only said second structure.

10. In a modulator circuit for supplying modulating voltages to a load including capacitance, a pair of electrode structures each having at least four electrodes and each including an anode, a cathode and a control electrode, said structures each having a high plate resistance, means coupling the anode-cathode paths of said structures in series across a single potential source, means coupling the said load to the cathode of a first one of said structures, means for applying an alternating modulating voltage to the control electrode of said first structure, and a connection capable of passing direct current coupling the anode of said first structure to the control electrode of a second one of said structures, the peak charging current for the load capacitance being of a value, at high time rates of change of modulating voltage, such as to develop a voltage at the anode of said first structure which is sufficient to bias said second structure to cutoff, and the negative-going portions of the input voltage wave, at high time rates of change of modulating voltage, being sufficient to cut off said first structure, whereby the discharging current of said load capacitance flows through only said second structure.

11. In a modulator circuit for supplying modulating voltages to a load including capacitance, a first plurality of electrode structures each including an anode, a cathode and a control electrode, means connecting the anodes of said structures together, means connecting the cathodes of said structures together, means connecting the control electrodes of said structures together, a second plurality of electrode structures each including an anode, a cathode and a control electrode, means connecting the anodes of said second plurality of structures together, means connecting the cathodes of said second plurality of structures together, means connecting the control electrodes of said second plurality of structures together, means connecting the paralleled anode-cathode paths of said first plurality of structures in series with the paralleled anode-cathode paths of said second plurality of structures across a potential source, means coupling the said load to the cathodes of the first plurality of structures, means for applying a modulating voltage to the control electrodes of the first plurality of structures, and means coupling the anodes of said first plurality of structures to the control electrodes of the second plurality of structures, the peak charging current for the load capacitance being of a value, at high time rates of change of modulating voltage, such as to develop a voltage at the anodes of said first plurality of structures which is sufficient to bias said second plurality of structures to cutoff.

12. In a modulator circuit for supplying modulating voltages to a load including capacitance, a first plurality of electrode structures each including an anode, a cathode and a control electrode, means connecting the anodes of said structures together, means connecting the cathodes of said structures together, means connecting the control electrodes of said structures together, a second plurality of electrode structures each including an anode, a cathode and a control electrode, means connecting the anodes of said second plurality of structures together, means connecting the cathodes of said second plurality of structures together, means connecting the control electrodes of said second plurality of structures together, means connecting the paralleled anode-cathode paths of said first plurality of structures in series with the paralleled anode-cathode paths of said second plurality of structures across a potential source, means coupling the said load to the cathodes of the first plurality of structures, means for applying an alternating modulating voltage to the control electrodes of the first plurality of structures, and means coupling the anodes of said first plurality of structures to the control electrodes of the second plurality of structures, the negative-going portions of the input voltage wave, at high time rates of change of modulating voltage, being sufficient to cut off said first plurality of structures, whereby the discharging current of said load capacitance flows through only said second plurality of structures.

13. In an amplifier circuit for supplying modulating voltages to a load, a first plurality of electrode structures each including an anode, a cathode and a control electrode, means connecting the anodes of said structures together, means connecting the cathodes of said structures together, means connecting the control elecrodes of said structures together, a second plurality of electrode structures each including an anode, a cathode and a control electrode, means connecting the anodes of said second plurality of structures together, means connecting the cathodes of said second plurality of structures together, means connecting the control electrodes of said second plurality of structures together, means connecting the paralleled anode-cathode paths of said first plurality of structures in series with the paralleled anode-cathode paths of said second plurality of structures across a potential source, means coupling the said load to the cathodes of the first plurality of structures, means for applying a modulating voltage to the control electrodes of the first plurality of structures, and means coupling the anodes of said first plurality of structures to the control electrodes of the second plurality of structures, the arrangement being such that the amplifier operates class A for low frequencies of modulating voltage and operates class B for higher frequencies of modulating voltage.

References Cited in the file of this patent

UNITED STATES PATENTS

| Number | Name | Date |
|---|---|---|
| 2,358,428 | White | Sept. 19, 1944 |